(12) United States Patent
Tomonaga et al.

(10) Patent No.: US 11,988,102 B2
(45) Date of Patent: May 21, 2024

(54) METHOD OF CLEANING BLADE OF ROTARY DEVICE

(71) Applicant: Mitsubishi Power, Ltd., Kanagawa (JP)

(72) Inventors: Nariyuki Tomonaga, Tokyo (JP); Hikaru Miyata, Yokohama (JP); Hiroyuki Mitsui, Tokyo (JP); Takayuki Ikarashi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 38 days.

(21) Appl. No.: 17/615,334

(22) PCT Filed: Jul. 14, 2020

(86) PCT No.: PCT/JP2020/027317
§ 371 (c)(1),
(2) Date: Nov. 30, 2021

(87) PCT Pub. No.: WO2021/020098
PCT Pub. Date: Feb. 4, 2021

(65) Prior Publication Data
US 2022/0220861 A1 Jul. 14, 2022

(30) Foreign Application Priority Data
Jul. 29, 2019 (JP) .................................. 2019-138754

(51) Int. Cl.
*F01D 25/00* (2006.01)
*B08B 1/14* (2024.01)
(Continued)

(52) U.S. Cl.
CPC ............ *F01D 25/002* (2013.01); *B08B 1/143* (2024.01); *B08B 3/08* (2013.01); *B08B 3/10* (2013.01); *F02C 7/00* (2013.01); *F05D 2220/32* (2013.01)

(58) Field of Classification Search
None
See application file for complete search history.

(56) References Cited

U.S. PATENT DOCUMENTS 1,766,624 A * 6/1930 Frohmann ............... D06F 53/00
211/209
4,713,120 A 12/1987 Hodgens, II et al.
(Continued)

FOREIGN PATENT DOCUMENTS

CN 1875131 12/2006
CN 103825414 A * 5/2014
(Continued)

OTHER PUBLICATIONS

CN103825414A translation (Year: 2023).*
(Continued)

*Primary Examiner* — Eric W Golightly
(74) *Attorney, Agent, or Firm* — Wenderoth, Lind & Ponack, L.L.P.

(57) ABSTRACT

A method of cleaning a blade of a rotary device includes: a first application step of applying a water-soluble cleaning liquid containing a surfactant to the blade; a setting-aside step of setting the blade to which the cleaning liquid has been applied aside; a first wiping step of wiping the blade after the setting-aside step; a second application step of applying water or a dilute cleaning liquid having a lower concentration of the surfactant than that in the cleaning liquid applied in the first application step to the blade after the first wiping step; and a second wiping step of wiping the blade after the second application step.

7 Claims, 2 Drawing Sheets

(51) Int. Cl.
B08B 3/08 (2006.01)
B08B 3/10 (2006.01)
F02C 7/00 (2006.01)

(56) References Cited

U.S. PATENT DOCUMENTS

| | | | |
|---|---|---|---|
| 7,018,965 B2 | 3/2006 | Yan et al. | |
| 9,790,808 B2 | 10/2017 | Rice et al. | |
| 2005/0049168 A1* | 3/2005 | Yan | C23G 1/24 |
| | | | 510/421 |
| 2009/0297352 A1* | 12/2009 | Walter | F03D 80/50 |
| | | | 416/223 R |
| 2020/0102523 A9 | 4/2020 | Tibbetts et al. | |

FOREIGN PATENT DOCUMENTS

| | | |
|---|---|---|
| CN | 104190669 | 12/2014 |
| JP | 63-3891 | 1/1988 |
| JP | 2007-504323 | 3/2007 |
| JP | 5184611 | 4/2013 |
| JP | 2013-221043 | 10/2013 |
| JP | 6113035 | 4/2017 |
| JP | 6255073 | 12/2017 |
| KR | 10-2006-0125697 | 12/2006 |
| WO | 2005/024095 | 3/2005 |

OTHER PUBLICATIONS

Japanese International Search Report dated Aug. 11, 2020, in International Application No. PCT/JP2020/027317, 10 pages.
Japanese International Preliminary Report on Patentability dated Feb. 10, 2022 in International Application No. PCT/JP2020/027317, with English translation, 5 pages.
Office Action dated Nov. 28, 2022 in counterpart CN Application No. 202080045121.1, 8 pages.
Office Action dated Apr. 11, 2023 in counterpart CN application No. 202080045121.1, 9 pages.
Office Action dated Dec. 11, 2023 in counterpart Korean Patent Application No. 10-2021-7042680 with English-language translation, 8 pages.

* cited by examiner

METHOD OF CLEANING BLADE OF ROTARY DEVICE

TECHNICAL FIELD

The present disclosure relates to a method of cleaning a blade of a rotary device.

BACKGROUND

Rotary devices, such as a compressor of a gas turbine, produce compressed air by compressing air from the atmosphere. Since the air in the atmosphere contains various dust particles, the dust is usually removed by an intake filter, but at least part of the dust that cannot be removed adheres to rotor and stator blades of the compressor. If dust adheres to the rotor and stator blades, the compressor efficiency of the compressor decreases, which may lead to a decrease in power generation efficiency. Therefore, it is important to clean blades of the compressor. Patent documents 1 and 2 describe cleaning by spraying a cleaning liquid to a rotating engine to cause it to suction.

CITATION LIST

Patent Literature

Patent Document 1: JP5184611B
Patent Document 2: JP6255073B

SUMMARY

Problems to be Solved

However, in cleaning the compressor of the gas turbine, the cleaning method by spraying a cleaning liquid from the intake side while the compressor is rotating, as described in Patent Documents 1 and 2, shows improved performance, but does not sufficiently remove dirt, and it is necessary to open the gas turbine for periodic inspection to wipe the blades.

In view of the above, an object of at least one embodiment of the present disclosure is to provide a method of cleaning a blade of a rotary device whereby it is possible to improve the workability.

Solution to the Problems

To achieve the above object, a method of cleaning a blade of a rotary device according to the present disclose comprises: a first application step of applying a water-soluble cleaning liquid containing a surfactant to the blade; a setting-aside step of setting the blade to which the cleaning liquid has been applied aside; a first wiping step of wiping the blade after the setting-aside step; a second application step of applying water or a dilute cleaning liquid having a lower concentration of the surfactant than that in the cleaning liquid applied in the first application step to the blade after the first wiping step; and a second wiping step of wiping the blade after the second application step.

Advantageous Effects

According to the method of cleaning a blade of a rotary device of the present disclosure, oil stain is removed by the first application step, the setting-aside step, and the first wiping step, and adhesion of dust due to oil stain is loosened, so that part of the dust is removed together with the oil stain in the first wiping step. However, if the dust is inorganic substances, which are more easily removed by a cleaning liquid with a higher moisture concentration, they may not be completely removed by the first application step and the first wiping step. In response to this, in the second application step, water or a dilute cleaning liquid having a lower concentration of the surfactant than that in the cleaning liquid applied in the first application step to the blade is used, which increases the concentration of dissolved dust and the adsorption to a rag, making it easier to wipe off the dust in the second wiping step. As a result, it is possible to improve the workability of cleaning the blade.

DETAILED DESCRIPTION

Hereinafter, the method of cleaning a blade of rotary machinery according to embodiments of the present disclosure will be described with reference to the drawings. The following embodiments are illustrative and not intended to limit the present disclosure, and various modifications are possible within the scope of technical ideas of the present disclosure.

<Description of Dirty State of Blade>

Figure 1:
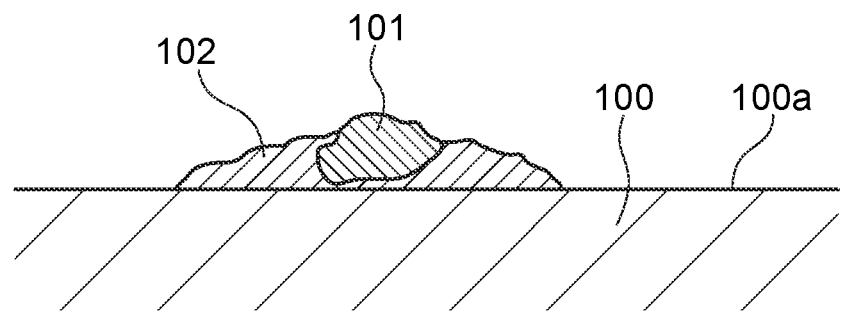
FIG. 1 is a partial enlarged cross-sectional view of a blade of a rotary device for showing an example of the dirty state of the blade.

Rotary devices such as, but not limited to, a compressor of a gas turbine, a gas compressor, and a turbocharger, produce compressed air by compressing air from the atmosphere. Since the air in the atmosphere contains various dust particles, the dust is usually removed by an intake filter, but at least part of the dust that cannot be removed adheres to blades of their rotary member. As shown in FIG. 1, dust 101 adhering to a surface 100a of a blade 100 is often fixed to the surface 100a due to oil stain 102. The method of cleaning a blade of a rotary device described below is particularly effective for cleaning a blade in this state, although not limited to cleaning a blade in this state.

<Description of Method of Cleaning Blade of Rotary Device>

Figure 2:
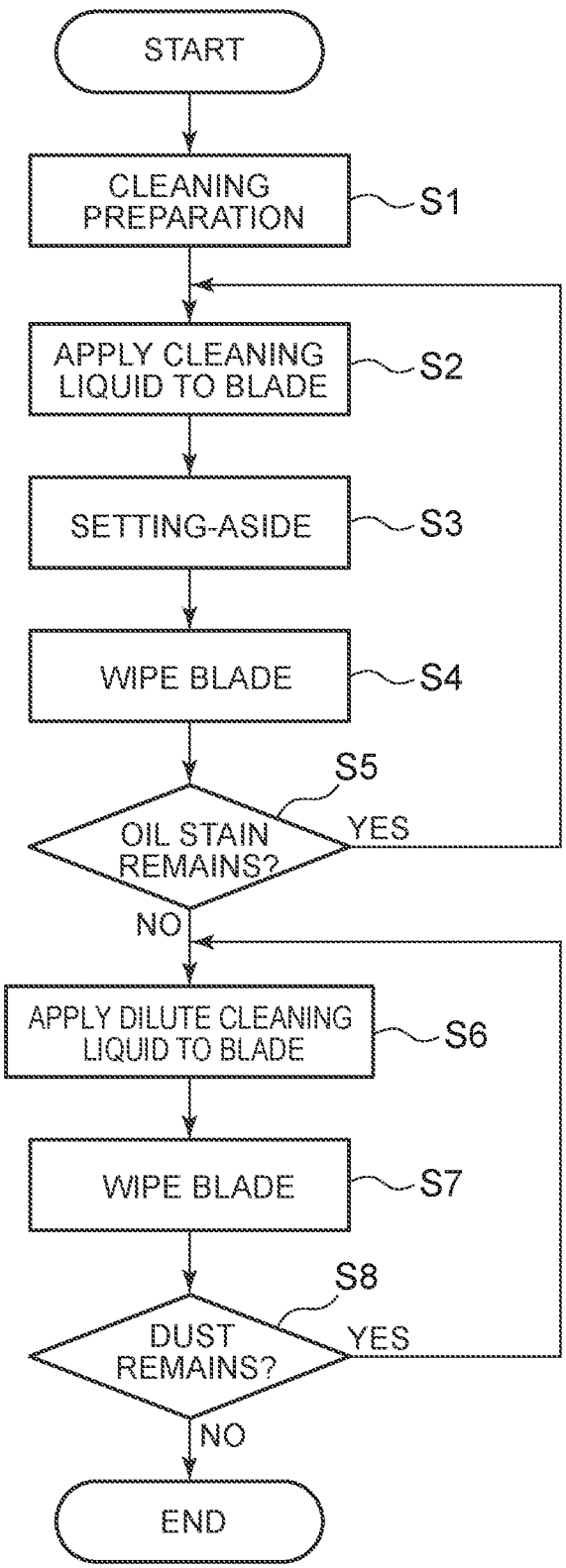
FIG. 2 is a flowchart of a method of cleaning a blade of a rotary device according to the present disclosure.

The method of cleaning a blade of a rotary device will be described in conjunction with the case of cleaning rotor and stator blades disposed in a compressor of a gas turbine. As shown in FIG. 2, in step S1, cleaning preparation is performed for cleaning work of the rotor and stator blades. For example, in the case where the casing defining the compartment of the compressor is configured to be disassembled into two parts, an upper part and a lower part, the rotor disposed in the compartment can be revealed by removing the upper part from the lower part. This rotor is lifted and removed from the compartment, and then fixed with the rotor hanged at a position (height) that is easy for the operator to work with. The cleaning operator can access both the rotor blade disposed in the hanged rotor and the stator blade fixed in the casing.

Once the cleaning preparation is completed, a cleaning liquid is applied to the surfaces of the rotor blade and the stator blade by spraying the cleaning liquid to the rotor blade and the stator blade (step S2). The application of the cleaning liquid is not limited to spraying, but may be performed in any way, such as wiping the surface of the blade with a rag containing the cleaning liquid.

The cleaning liquid preferably used in the present method is a water-soluble cleaning liquid containing a surfactant. Since blades of a compressor are often coated with a sermetel coating, which is mainly composed of aluminum, or partially with a thermal barrier coating, in order not to adversely affect them, the cleaning liquid is preferably neutral, i.e., the pH of the cleaning liquid is preferably 6 to 8. Examples of such a cleaning liquid include CLEANTHROUGH™ TW-100 (pH 6.7), KS-1000 (pH 8), KS-7405 (pH 6.4), LC-940 and MC-02 (pH 7) commercially available from Kao Corporation. For example, CLEANTHROUGH™ TW-100 contains alkyl polyglucosides and polyhydroxyalkyl ethers as surfactants.

After applying the cleaning liquid to the surface of the blade, the blade is set aside as it is (step S3). The setting-aside time is not particularly limited as it depends on the dirty state of the blade, but may be any time in the range of 1 to 60 minutes, for example, 5 minutes. If an organic solvent is used as the cleaning liquid, it evaporates when left to stand, but if a water-soluble cleaning liquid containing a surfactant is used, it can be left to stand in this way. This setting aside increases the emulsifying and dispersing effects of the surfactant on oil stain, thus improving the removal rate of oil stain.

After setting aside for a certain time, the surface of the blade is wiped with a rag (step S4). Since oil stain adhering to the blade is emulsified and dispersed by the surfactant in step S3, at least part of the oil stain is removed from the surface of the blade by wiping with a rag in step S4. The emulsification and dispersion of the oil stain loosen the adhesion of the dust to the surface of the blade due to the oil stain, so that at least part of the dust can also be removed from the surface of the blade when wiping with a rag.

Then, in step S5, it is visually checked whether the oil stain remains on the surface of the blade wiped with the rag. If the oil stain remains, the process returns to step S2, and steps S2 to S4 are repeated. If it is determined that the oil stain have been completely removed by visual check in step S5, a dilute cleaning liquid, for example, but not limited to, a 10-fold dilute cleaning liquid, having a lower concentration of the surfactant than that in the cleaning liquid used in step S2 is sprayed on the surface of the blade wiped with the rag to apply the dilute cleaning liquid to the surfaces of the rotor blade and the stator blade (step S6). The application of the dilute cleaning liquid is not limited to spraying, but may be performed in any way, such as wiping the surface of the blade with a rag containing the dilute cleaning liquid, as in step S2. The pH of the dilute cleaning liquid is preferably 6 to 8 for the same reason as the cleaning liquid.

Then, in step S7, the surface of the blade is wiped with a rag. In step S7, since no oil stain remains, the dust is removed from the blade surface by wiping with a rag, together with the dilute cleaning liquid applied to the blade surface. If the dust is inorganic substances, a high concentration of the surfactant in the cleaning liquid reduces the dissolution or adsorption on the rag, so that they may not be completely removed by steps S2 to S4. In response to this, in step S6, the dilute cleaning liquid having a lower concentration of the surfactant than that in the cleaning liquid applied in step S2 to the blade is used, which increases the concentration of dissolved dust, making it easier to wipe off the dust in step S7.

Then, in step S8, it is visually checked whether the dust remains on the surface of the blade wiped with the rag. If the dust remains, the process returns to step S6, and steps S6 and S7 are repeated. If it is determined that the dust has been completely removed by visual check in step S8, the cleaning work is completed.

Thus, the oil stain is removed by steps S2 to S4, and adhesion of the dust due to the oil stain is loosened, so that part of the dust is removed together with the oil stain in step S4. In step S6, the dilute cleaning liquid having a lower concentration of the surfactant than that in the cleaning liquid applied in step S2 to the blade is used, making it easier to wipe off the dust in step S7. As a result, it is possible to improve the workability of cleaning the blade.

In step S6, the dilute cleaning liquid is applied to the surface of the blade, but water may be applied instead. After the cleaning liquid is applied to the surface of the blade in step S2, the cleaning liquid is wiped off with a rag in step S4, but part of the surfactant in the cleaning liquid often remains adhering to the surface of the blade. When water is applied to the surface of the blade in this state, the surfactant adhering to the blade dissolves in the water to produce a dilute cleaning liquid, so that it is possible to make the state similar to the state where the dilute cleaning liquid is applied to the surface of the blade.

(1) A method of cleaning a blade of a rotary device according to an aspect includes: a first application step (step S2) of applying a water-soluble cleaning liquid containing a surfactant to the blade; a setting-aside step (step S3) of setting the blade to which the cleaning liquid has been applied aside; a first wiping step (step S4) of wiping the blade after the setting-aside step; a second application step (step S6) of applying water or a dilute cleaning liquid having a lower concentration of the surfactant than that in the cleaning liquid applied in the first application step to the blade after the first wiping step; and a second wiping step (step S7) of wiping the blade after the second application step.

Generally, dust adhering to the blade is often fixed to the blade surface due to oil stain. Therefore, according to the method of cleaning a blade of a rotary device of the present disclosure, the oil stain is removed by the first application step, the setting-aside step, and the first wiping step, and adhesion of the dust is loosened, so that part of the dust is removed together with the oil stain in the first wiping step. In the second application step, water or a dilute cleaning liquid having a lower concentration of the surfactant than that in the cleaning liquid applied in the first application step to the blade is used, making it easier to wipe off the dust in the second wiping step. As a result, it is possible to improve the workability of cleaning the blade.

(2) A method of cleaning a blade of a rotary device according to another aspect is the method of cleaning a blade of a rotary device described in (1) includes a cleaning preparation step (step S1) of removing a rotary member including the blade from the rotary device and hanging the rotary member before the first application step (step S2).

This configuration allows the operator to clean the blade while the rotary member including the blade is hanged at a position (height) that is easy for the operator to work with, thus improving the workability of cleaning the blade.

(3) A method of cleaning a blade of a rotary device according to still another aspect is the method of cleaning a blade of a rotary device described in (1) or (2) in which the first application step (step S2), the setting-aside step (step S3), and the first wiping step (step S4) are repeated at least once in this order after the first wiping step (step S4).

With this configuration, since the removal of oil stain is repeated, the oil stain can be reliably removed.

(4) A method of cleaning a blade of a rotary device according to still another aspect is the method of cleaning a blade of a rotary device described in any one of (1) to (3) in which the second application step (step S6) and the second wiping step (step S7) are repeated at least once in this order after the second wiping step (step S7).

With this configuration, since the removal of dust is repeated, the dust can be reliably removed.

(5) A method of cleaning a blade of a rotary device according to an aspect is the method of cleaning a blade of a rotary device described in any one of (1) to (4) in which a time of setting the blade aside in the setting-aside step (step S3) is 1 to 60 minutes.

With this configuration, since the emulsifying and dispersing effects of the surfactant on oil stain is increased, the oil stain can be reliably removed.

(6) A method of cleaning a blade of a rotary device according to an aspect is the method of cleaning a blade of a rotary device described in any one of (1) to (5) in which pH of the cleaning liquid and the dilute cleaning liquid is 6 to 8.

With this configuration, the cleaning liquid can be used for the blade coated with a sermetel coating, which is mainly composed of aluminum, or a part with a thermal barrier coating.

(7) A method of cleaning a blade of a rotary device according to an aspect is the method of cleaning a blade of a rotary device described in any one of (1) to (6) in which the rotary device is a compressor of a gas turbine, a gas compressor, or a turbocharger.

With this configuration, it is possible to improve the workability of cleaning the blade of a compressor of a gas turbine, a gas compressor, or a turbocharger.

REFERENCE SIGNS LIST

100 Blade
100a Surface (of blade)
101 Dust
102 Oil stain

The invention claimed is:

1. A method of cleaning a blade of a rotary device, comprising:
   a cleaning preparation step of removing a rotary member including the blade from the rotary device and hanging the rotary member;
   a first application step of applying a water-soluble cleaning liquid containing a surfactant to the blade following the cleaning preparation step;
   a setting-aside step of setting the blade aside after the cleaning liquid has been applied in the first application step;
   a first wiping step of wiping the blade with a rag after the setting-aside step;
   a second application step of applying water or a dilute cleaning liquid having a lower concentration of the surfactant than that in the cleaning liquid applied in the first application step to the blade after the first wiping step; and
   a second wiping step of wiping the blade with a rag after the second application step.

2. The method of cleaning a blade of a rotary device according to claim 1,
   wherein the first application step, the setting-aside step, and the first wiping step are repeated at least once in this order after the first wiping step.

3. The method of cleaning a blade of a rotary device according to claim 1,
   wherein the second application step and the second wiping step are repeated at least once in this order after the second wiping step.

4. The method of cleaning a blade of a rotary device according to claim 1,
   wherein a time of setting the blade aside in the setting-aside step is 1 minute to 60 minutes.

5. The method of cleaning a blade of a rotary device according to claim 1,
   wherein a pH of the cleaning liquid and the dilute cleaning liquid is 6 to 8.

6. The method of cleaning a blade of a rotary device according to claim 1,
   wherein the rotary device is a compressor of a gas turbine, a gas compressor, or a turbocharger.

7. A method of cleaning rotor and stator blades of a rotary device, the method comprising:
   a cleaning preparation step of removing an upper part of a rotary device casing and removing a rotary member including the rotor blade from the rotary device and hanging the rotary member to permit access to the rotor blade;
   a first application step of applying a water-soluble cleaning liquid containing a surfactant to the rotor blades following the cleaning preparation step;
   a setting-aside step of setting the rotor blades aside after the cleaning liquid has been applied in the first application step;
   a first wiping step of wiping the rotor blades with a rag after the setting-aside step;
   a second application step of applying water or a dilute cleaning liquid having a lower concentration of the surfactant than that in the cleaning liquid applied in the first application step to the rotor blades after the first wiping step; and
   a second wiping step of wiping the rotor blades with a rag after the second application step.

* * * * *